No. 665,790. Patented Jan. 8, 1901.
T. LEDERMÜLLER.
ROLLING MILL FOR MANUFACTURING CYLINDRICAL ARTICLES.
(Application filed Mar. 6, 1900.)
(No Model.) 6 Sheets—Sheet 1.
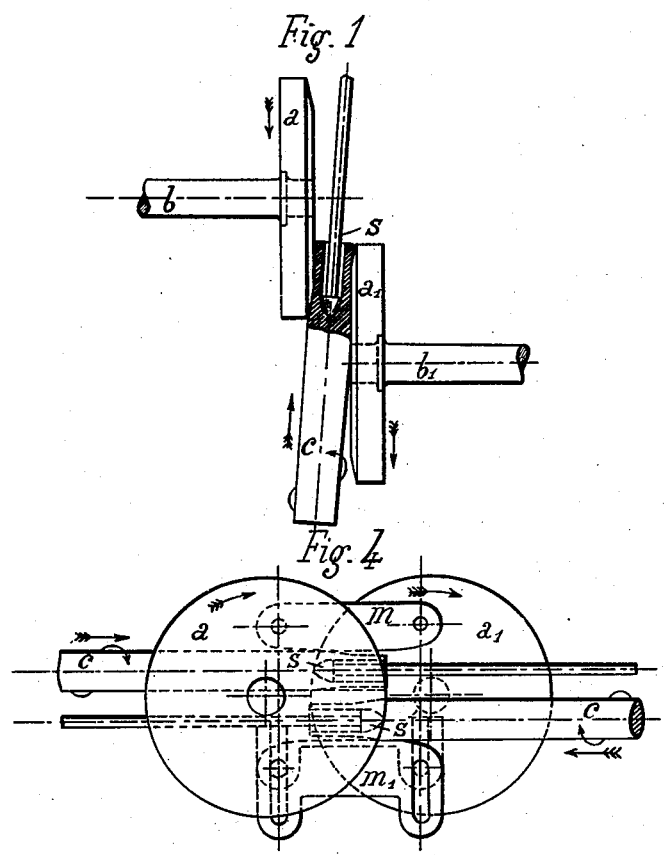
Witnesses:
Inventor:
Theodor Ledermüller.
By James L. Norris,
Atty.

No. 665,790. Patented Jan. 8, 1901.
T. LEDERMÜLLER.
ROLLING MILL FOR MANUFACTURING CYLINDRICAL ARTICLES.
(Application filed Mar. 6, 1900.)
(No Model.) 6 Sheets—Sheet 2.
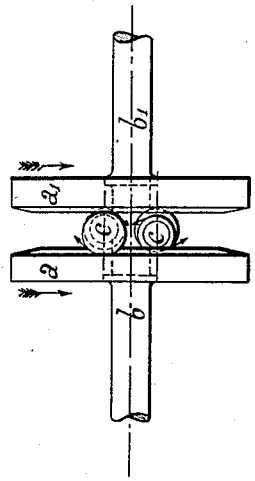
Fig. 3.
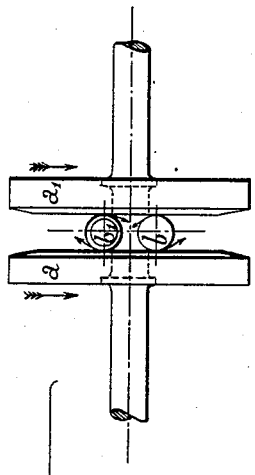
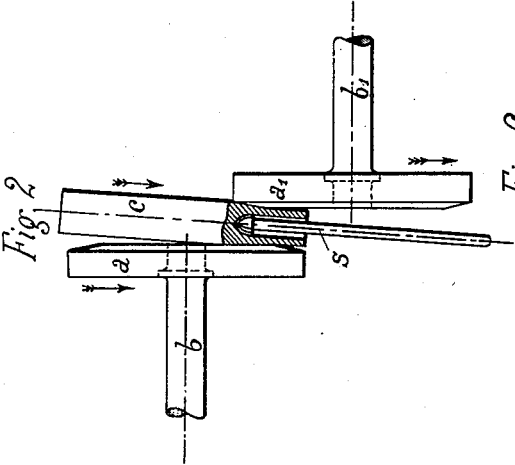
Fig. 2.
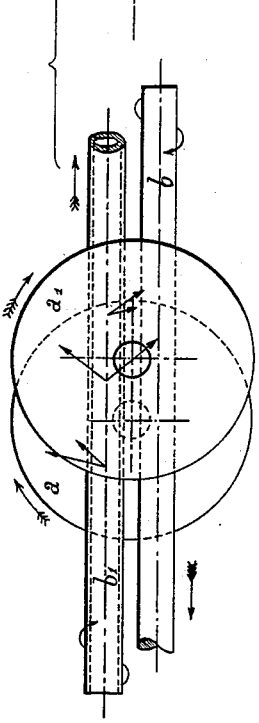
Fig. 6.
Witnesses:
Inventor:
Theodor Ledermüller.
By James L. Norris.
Atty.

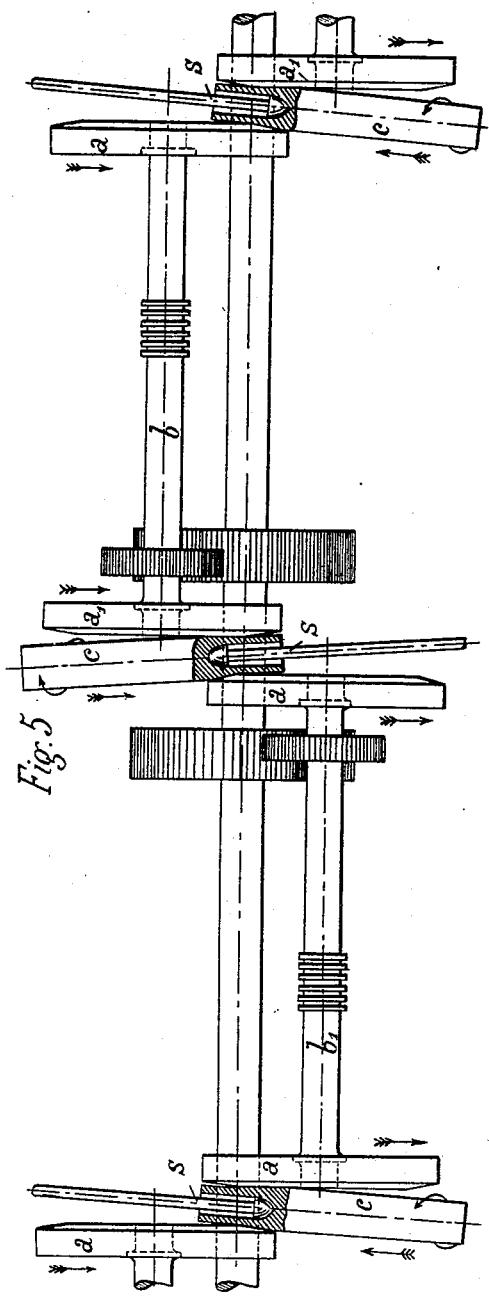

No. 665,790. Patented Jan. 8, 1901.
T. LEDERMÜLLER.
ROLLING MILL FOR MANUFACTURING CYLINDRICAL ARTICLES.
(Application filed Mar. 6, 1900.)
(No Model.) 6 Sheets—Sheet 4.

Witnesses:

Inventor:
Theodor Ledermüller.
By James L. Norris.
Atty.

No. 665,790. Patented Jan. 8, 1901.
T. LEDERMÜLLER.
ROLLING MILL FOR MANUFACTURING CYLINDRICAL ARTICLES.
(Application filed Mar. 6, 1900.)
(No Model.) 6 Sheets—Sheet 6.

Witnesses: Inventor:
Theodor Ledermüller.
By James L. Norris.
Atty.

UNITED STATES PATENT OFFICE.

THEODOR LEDERMÜLLER, OF LEMBERG-PODZAMCZE, AUSTRIA-HUNGARY.

ROLLING-MILL FOR MANUFACTURING CYLINDRICAL ARTICLES.

SPECIFICATION forming part of Letters Patent No. 665,790, dated January 8, 1901.

Application filed March 6, 1900. Serial No. 7,557. (No model.)

*To all whom it may concern:*

Be it known that I, THEODOR LEDERMÜLLER, a subject of the Emperor of Austria-Hungary, residing at Lemberg-Podzamcze, Austria-Hungary, have invented certain new and useful Improvements in Rolling-Mills for the Manufacture of Cylindrical Articles, of which the following is a specification, taken in connection with the accompanying drawings.

This invention relates to a rolling-mill whereby solid or hollow metal cylindrical articles, and more especially tubes, can be made, without welding, from solid metallic blocks.

This rolling-mill is characterized by the employment of revolving friction-disks in combination with a fixed mandrel (for the working of hollow cylinders) provided with a rounded head for forming the central perforation in the article to be made, as hereinafter explained with reference to the accompanying drawings, in which—

Figure 7:
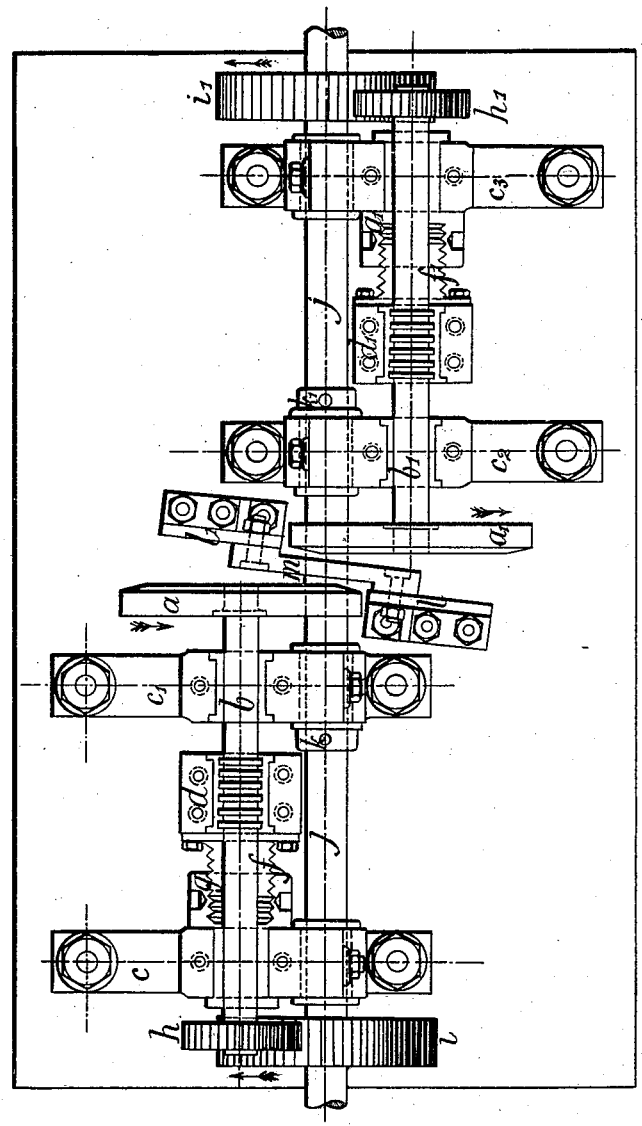
Figure 8:
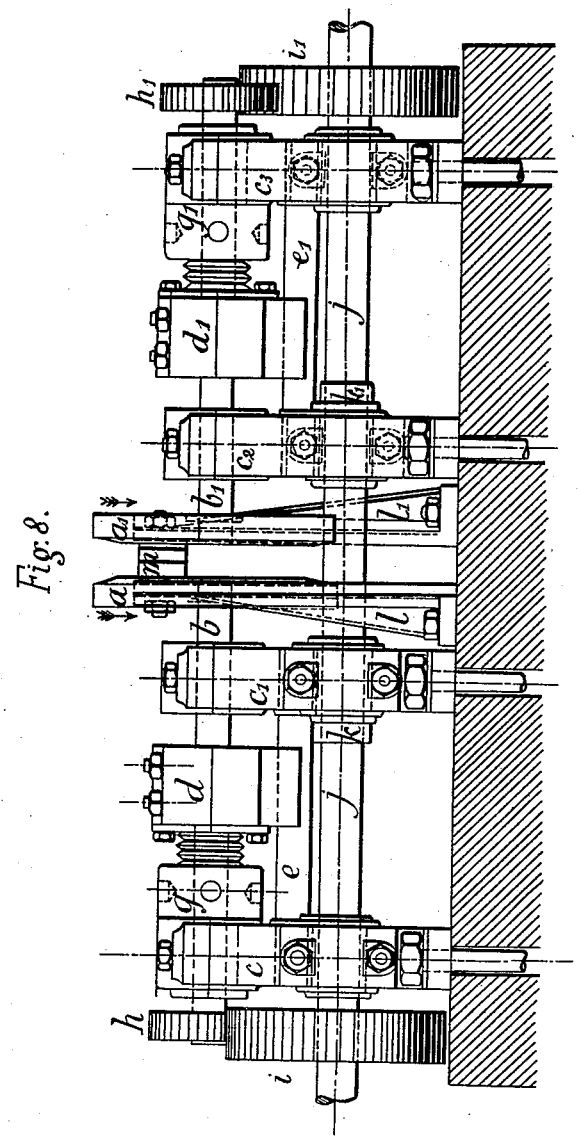
Figure 9:
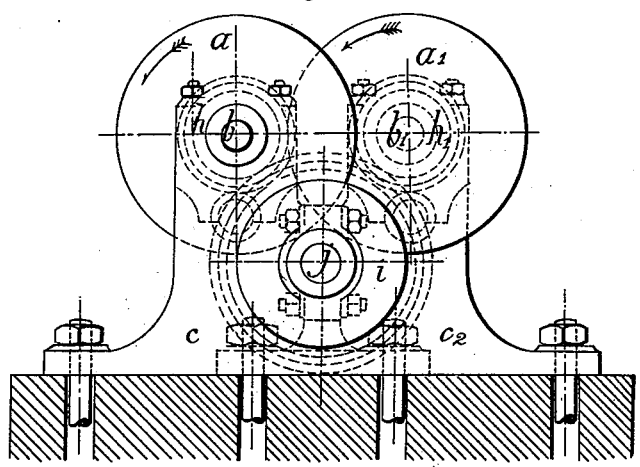
Figure 10:
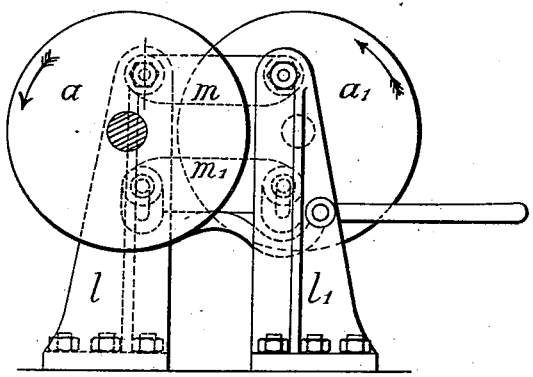

Figures 1, 2, and 3 are explanatory diagrams showing, respectively in plan, Figs. 1 and 2, and in side view, Fig. 3, the relative arrangement of the essential parts (friction-disks and mandrel) of the apparatus. Figs. 4, 5, and 6 are diagrams showing the various theoretical modes of working of the apparatus. Figs. 7, 8, and 9 represent, respectively in plan, in longitudinal elevation, and in side elevation, a working construction of a rolling-mill according to my system. Fig. 10 is a detail view showing in elevation oblique supports and guide-pieces, the purpose of which is hereinafter indicated.

The essential parts of the apparatus consist of two friction-disks $a$ $a'$, Figs. 1 and 2, whose outer faces have each a plain central portion and a peripheral portion presenting the form of a very wide truncated cone. These disks, the distance apart of which can be varied, are keyed on the ends of two horizontal shafts $b$ $b$, and are driven in the same direction, as indicated by the arrows, with equal angular speed by suitable mechanism. Between the disks, when the apparatus is to be used for making hollow metal cylinders, and slightly above or below the plane of the geometrical axes of the shafts $b$ $b'$, is arranged one or two mandrels $s$, having rounded heads of very hard metal. If when so arranged a cylindrical piece of metal $c$ (previously heated to the necessary temperature, varying according to the nature of the metal) be introduced obliquely in the direction of the mandrel $s$, in the position shown in Fig. 1, between the friction-disks, this piece will be carried forward by the friction-disks $a$ $a'$ and will at the same time be rolled by them—that is to say, they will press or draw the portions which come into contact with their truncated periphery over the mandrel $s$ and will thus progressively convert the solid piece $c$ into a hollow cylinder in which the said mandrel occupies the axis. The total mass of the piece $c$ will be utilized to form the sides of the cylinder being made. When the work is to remain solid, it is sufficient to proceed in the same manner, but without using the mandrel $s$.

It will be seen from Fig. 4 that the work $c$ can be introduced either from the right or from the left at a suitable angle relatively to the friction-disk $a$ $a'$. The said work is maintained by two guide-pieces $m$ and $m'$, of which $m$ is fixed and $m'$ is movable, and is provided with two slots serving as guides and stops.

It will readily be understood from Fig. 4 that if the work $c$ be introduced from the left it will be the guide-piece $m'$ which must be raised up to the center of the disks $a$ and $a'$, and such work will in this case slide between the two guide-pieces $m$ and $m'$; but if it be introduced from the right the guide-piece $m'$ must be placed lower than the center of the disks $a$ and $a'$, and the work $c$ will then slide only on the guide-piece $m'$. This arrangement instead of being single may be constructed multiple by mounting, as shown in Fig. 5, a friction-disk at each end of one of the shafts $b$ or $b'$, so as to combine in one mill several single rolling-mills driven from a single main driven shaft by means of toothed wheels. The same apparatus is also applicable, with slight modification, to the polishing and dressing of solid or hollow cylindrical work, such as driving-shafts, tubes, and the like. To render these operations possible, it is only necessary to bring the axes of the disks $a$ and $a'$ nearer together, and this can easily be effected by setting the bearings of these shafts in such a way as to render them movable on their foundations, as will be explained farther on, thus allowing of the disks $a$ and $a'$ being employed like bevel friction-wheels.

For cylindrical polishing I proceed in the following manner: The solid cylindrical work $b$, (or the hollow cylinder $b'$,) Fig. 6, is introduced horizontally from the right or from the left between the plain faces of the disks $a$ and $a'$, above or below the horizontal plane of the axes, by also employing in this case the guide-pieces $m$ and $m'$. In this way the rotation of the rolling-disks polishes the work, at the same time causing it to pass from one side of the apparatus to the other. It will be seen that in the inner portion—that is to say, in the space between the vertical planes passing through the axes of the shafts of the disks $a$ and $a'$—these disks cause the solid or hollow piece to revolve in the same direction, but that in the portions outside the two planes above indicated they act in a contrary direction. The travel of the work is due to the sliding friction, giving in the three spaces on the lines of contact a component of translation situated in the direction of the movement of the tops of the disks. In a word, the solid cylinder $b$ and the hollow cylinder $b'$ are thus actuated by a movement of constant translation at the same time they are polished and dressed.

Figs. 7 to 10 show, by way of example, a constructive form of rolling-mill made in accordance with my invention and carrying into effect the practical application of the mechanical consideration above set forth.

The friction-disks $a$ and $a'$, constructed in the manner described at the outset of the specification, are keyed on their shafts $b$ and $b'$. These latter are supported in four bearings $c\ c'\ c^2\ c^3$, in which they can revolve and be at the same time shifted for a certain length in the direction of their longitudinal axes. The said shafts are also provided at their middle with a suitable number of rings or collars carefully fitted in the bearings of two thrust-blocks $d\ d'$, movable on slide-guides $e\ e'$, of circular section, parallel with the shafts $b\ b'$. On these thrust-blocks are bolted or fixed by any suitable means screw-threaded extensions $f\ f'$, engaging in nuts $g\ g'$, secured to the end bearings $c\ c^3$, in which they can turn without shifting in the direction of their axes. By imparting to these nuts, either by means of a spanner or by any other appropriate means, an equal movement of rotation of the desired angle in one or the other direction I thus displace both the thrust-blocks $d\ d'$ and the shafts $b\ b'$, which allows me to increase or to diminish at will the relative distance between the disks $a\ a'$ and to regulate it in a rapid and precise manner according to the diameter of the cylinder to be worked on. On the ends of the shafts $b\ b'$ are keyed the pinions $h\ h'$, which gear with the toothed wheels $i\ i'$, mounted fast on the main driving-shaft $j$, which revolves in the bearings $c\ c'\ c^2\ c^3$, relatively to which it is prevented from moving in the longitudinal direction by means of collars $k\ k'$. The movement of rotation is thus transmitted at the same rate through the gear-wheels $i\ h$ and $i'\ h'$ on the main shaft $j$ to the shafts $b\ b'$, and hence the parallel disks $a\ a'$ revolve in the same direction with equal angular speeds. The guide-pieces $m$ and $m'$, between which moves the work to be operated on, are carried by two oblique vertical supports or standards $l\ l'$, strengthened by webs. (Seen in plan and side view in Figs. 7 and 8 and shown apart in elevation in Fig. 10.) One of these guide-pieces $m$ is placed at the upper part and is a fixture, while the other, $m'$, situated below it, is capable of rising and falling a certain distance in slots made for this purpose in the standards $l\ l'$, Fig. 10. The raising of this guide-piece $m'$ up to the center of the disks $a\ a'$ and the lowering of the same are effected by means of a lever $n$, articulated on a pivot fixed to the standard $l'$. Said lever $n$, as well as the guide-piece $m'$, are not shown in Figs. 7, 8, and 9, so as not to unnecessarily complicate the drawings.

It should be stated that upon one and the same main driving-shaft it is easy to mount several rolling apparatus next to each other without resorting to driving-belts, connecting-rods, or other analogous mechanical means. To this end it is only necessary, as shown in Fig. 5, to make the said shaft long enough and to key thereon the toothed wheels $i\ i'$, transmitting the movements to each individual rolling-mill. This is an important advantage of my system of rolling-mill, besides which it can be utilized not only for the manufacture of hollow articles and tubes, but also for rolling cylindrical vessels provided with bottoms or solid pieces in any forgeable and rollable metal. Furthermore, it can be converted into a mill for polishing and dressing solid or hollow cylinders and all other cylindrical hollow bodies by shifting the bearings of the shafts of the disks $a\ a'$ horizontally, so as to give them the suitable relative separation.

Having now particularly described and ascertained the nature of my said invention and in what manner the same is to be performed, I declare that what I claim is—

In a rolling-mill for the manufacture of hollow cylindrical articles, the combination with a suitable frame or housing, of a pair of horizontally-adjustable shafts, a pair of disks connected to said shafts, arranged in suitable relation to each other and having their opposing faces formed with a plain central portion and the periphery thereof truncated, means for rotating said disks in the same direction, a pair of oblique vertical standards, a fixed guide carried thereby and arranged in suitable relation to said disks, a movable guide carried by said standard and arranged in suitable relation to said disks, a lever for adjusting the position of said movable guide, and a mandrel arranged in suitable relation to said disks.

In witness whereof I have hereunto set my hand in presence of two witnesses.

THEODOR LEDERMÜLLER.

Witnesses:
ALBERT BEUCKE,
ALVESTO S. HOGUE.